United States Patent
Kouchi et al.

(10) Patent No.: US 11,320,176 B2
(45) Date of Patent: May 3, 2022

(54) THERMOACOUSTIC DEVICE WITH DIAPHRAGM STRUCTURE

(71) Applicants: JTEKT CORPORATION, Osaka (JP); University Public Corporation Osaka, Osaka (JP)

(72) Inventors: Tatsuma Kouchi, Kashiwara (JP); Tomoyuki Takei, Nara (JP); Kunio Ohara, Osaka (JP); Hiroki Tanaka, Kashihara (JP); Osamu Ishikawa, Osaka (JP)

(73) Assignees: JTEKT CORPORATION, Osaka (JP); UNIVERSITY PUBLIC CORPORATION OSAKA, Osaka (JP)

( * ) Notice: Subject to any disclaimer, the term of this patent is extended or adjusted under 35 U.S.C. 154(b) by 0 days.

(21) Appl. No.: 16/860,838

(22) Filed: Apr. 28, 2020

(65) Prior Publication Data

US 2020/0355408 A1    Nov. 12, 2020

(30) Foreign Application Priority Data

May 9, 2019  (JP) .............................. JP2019-089175

(51) Int. Cl.
F25B 9/14    (2006.01)
(52) U.S. Cl.
CPC .......... *F25B 9/145* (2013.01); *F02G 2243/54* (2013.01); *F25B 2309/1402* (2013.01);
(Continued)
(58) Field of Classification Search
CPC ...... F25B 2309/1403; F25B 2309/1405; F25B 2309/1409; F25B 9/145; F25B 2309/1402; F25B 2309/1427; F02G 2243/54
See application file for complete search history.

(56) References Cited

U.S. PATENT DOCUMENTS

| 7,081,699 B2* | 7/2006 | Keolian ................ H01L 41/113 310/306 |
| 7,908,856 B2* | 3/2011 | Backhaus ............. F02G 1/0435 60/517 |
| 8,375,729 B2* | 2/2013 | Schwartz ................ F25B 9/145 62/6 |

(Continued)

FOREIGN PATENT DOCUMENTS

| JP | 2005-188401 A | 7/2005 |
| JP | 2013-117324 A | 6/2013 |

(Continued)

OTHER PUBLICATIONS

Oct. 1, 2020 Extended Search Report issued in European Patent Application No. 20172387.1.

*Primary Examiner* — Lionel Nouketcha
(74) *Attorney, Agent, or Firm* — Oliff PLC

(57) ABSTRACT

A thermoacoustic device includes a loop tube in which a working gas is sealed; a stack in which a temperature gradient is generated in a tube axis direction of the loop tube, the stack being provided in the loop tube; and a diaphragm structure including a diaphragm provided in the loop tube and an operation unit, the diaphragm having a surface extending in a direction intersecting the tube axis direction and being configured to vibrate with a component of vibration in the tube axis direction, and the operation unit being configured to apply a physical quantity that is required, to the diaphragm to change a rigidity of the diaphragm in the tube axis direction.

7 Claims, 3 Drawing Sheets

(52) U.S. Cl.
CPC ......... *F25B 2309/1403* (2013.01); *F25B 2309/1405* (2013.01); *F25B 2309/1409* (2013.01); *F25B 2309/1427* (2013.01)

(56) References Cited

U.S. PATENT DOCUMENTS 8,567,187 B2 * 10/2013 Nakamura ............ F02G 1/04
60/517
2019/0242624 A1    8/2019 Saito et al.

FOREIGN PATENT DOCUMENTS

| JP | 2018-066501 A | 4/2018 |
| JP | 2018-091279 A | 6/2018 |

* cited by examiner

THERMOACOUSTIC DEVICE WITH DIAPHRAGM STRUCTURE

CROSS-REFERENCE TO RELATED APPLICATION

This application claims priority to Japanese Patent Application No. 2019-089175 filed on May 9, 2019, incorporated herein by reference in its entirety.

BACKGROUND

1. Technical Field

The disclosure relates to a thermoacoustic device.

2. Description of Related Art

There is a thermoacoustic device using a thermoacoustic effect, which is a phenomenon of conversion between heat energy and sound energy (for example, see Japanese Unexamined Patent Application Publication No. 2018-66501 (JP 2018-66501 A)). The thermoacoustic device includes a loop tube in which a working gas is sealed, and a stack (regenerator) provided in the loop tube. When a temperature gradient occurs in the stack, self-excited sound waves are generated. The energy of the sound waves is used for various tasks.

SUMMARY

The thermoacoustic device disclosed in JP 2018-66501 A includes a diaphragm provided in the loop tube. By providing the diaphragm at an appropriate position, the sound waves in the loop tube may be amplified. That is, the diaphragm can affect the pressure vibration of the working gas, and can improve the efficiency of work achieved by the thermoacoustic phenomenon.

The amplitude (amplitude amount) of the pressure of the working gas in the loop tube changes in a process including an initial stage immediately after the start of operation, a transition period, and a stable period in which the operation is continued. That is, the amplitude (amplitude amount) of the pressure of the working gas in the loop tube in the initial stage, the amplitude (amplitude amount) in the transition period, and the amplitude (amplitude amount) in the stable period may be different from each other. Further, a filling pressure of the working gas in the loop tube may change. Characteristics such as the thickness of the diaphragm greatly affect the movement of the fluid (i.e., the working gas). Thus, if the diaphragm has characteristics that change in accordance with the pressure amplitude and the filling pressure of the working gas, the efficiency of work achieved by the thermoacoustic phenomenon can be further improved. Hitherto, to change the characteristics of the diaphragm, it has been necessary to replace the diaphragm and to reassemble the device.

The disclosure provides a thermoacoustic device that makes it possible to improve the efficiency of work achieved by a thermoacoustic phenomenon without replacing a diaphragm.

An aspect of the disclosure relates to a thermoacoustic device. The thermoacoustic device includes a loop tube in which a working gas is sealed; a stack in which a temperature gradient is generated in a tube axis direction of the loop tube, the stack being provided in the loop tube; and a diaphragm structure including a diaphragm provided in the loop tube and an operation unit, the diaphragm having a surface extending in a direction intersecting the tube axis direction and being configured to vibrate with a component of vibration in the tube axis direction, and the operation unit being configured to apply a physical quantity that is required, to the diaphragm to change a rigidity of the diaphragm in the tube axis direction. The characteristics of the diaphragm affect the movement of the working gas. Therefore, in the thermoacoustic device, the rigidity of the diaphragm is changed without replacing the diaphragm. This makes it possible to improve the efficiency of work achieved by the thermoacoustic phenomenon.

The diaphragm may be a thin film member having an inverse piezoelectric effect; and the operation unit may include electrodes configured to generate a potential difference in the diaphragm, and a power supply configured to apply a voltage to the electrodes. In this case, the electrodes are provided on the diaphragm, and the power supply applies a voltage to the diaphragm via the electrodes. Thus, the diaphragm can be deformed by the inverse piezoelectric effect and the rigidity of the diaphragm can be changed.

The diaphragm may be configured to expand and contract in a direction along the surface based on the physical quantity; the diaphragm structure may further include a restraining member that restrains a peripheral portion of the diaphragm; and a region of the diaphragm may be configured to vibrate in the tube axis direction, the region of the diaphragm being closer to a center of the diaphragm than the peripheral portion is. With the above configuration, the diaphragm is restrained at a peripheral portion thereof. Thus, when the diaphragm expands in the direction along the surface, the rigidity of the diaphragm in the tube axis direction decreases. In contrast, when the diaphragm contracts in the direction along the surface, the rigidity of the diaphragm in the tube axis direction increases.

The diaphragm structure may further include an electronic control unit configured to perform control to change the physical quantity applied to the diaphragm. In this case, it is possible to variously change the rigidity of the diaphragm in accordance with the state of the thermoacoustic device.

The thermoacoustic device including the electronic control unit may further include a sensor configured to detect a parameter correlated with a work flow of the working gas. The electronic control unit may be configured to perform control to reduce the rigidity of the diaphragm when the parameter changes due to a decrease in the work flow, and to increase the rigidity of the diaphragm when the parameter changes due to an increase in the work flow. With the above configuration, when the work flow of the working gas is small, the thermoacoustic device is adjusted such that the rigidity of the diaphragm is reduced and the vibration of the working gas is less likely to be hindered by the diaphragm to increase the work flow. In contrast, with the above configuration, when the work flow of the working gas is large, the thermoacoustic device is adjusted such that the rigidity of the diaphragm is increased and the vibration of the working gas is restrained by the diaphragm to reduce the work flow.

The thermoacoustic device including the electronic control unit may further include a sensor configured to detect a parameter correlated with a work flow of the working gas. The parameter may be one of i) a temperature of the stack, ii) an ambient temperature around the stack, and iii) a pressure amplitude of the working gas. The temperature of the stack, the ambient temperature around the stack, and the pressure amplitude of the working gas are the parameters that affect the magnitude of the work flow of the working gas. In view of this, the parameters are detected using the sensor, and thus, the rigidity of the diaphragm can be adjusted in accordance with the work flow. Therefore, it is possible to further improve the efficiency of work achieved by the thermoacoustic phenomenon.

The thermoacoustic device including the electronic control unit may further include a sensor configured to detect a parameter correlated with a work flow of the working gas. The electronic control unit may be configured to increase the rigidity of the diaphragm to a rigidity that allows vibration of the working gas to be restrained, when the parameter exceeds a threshold. With the above configuration, for example, the thermoacoustic phenomenon in the thermoacoustic device can be stopped without stopping the operation of equipment configured to apply heat to the stack.

The thermoacoustic device may further include a vibration power generation unit provided on a tube wall of the loop tube and configured to convert vibration of the tube wall to electric energy; and a harvest power supply unit configured to output energy to apply the physical quantity that is required, to the diaphragm based on the electric energy. With the above configuration, it is possible to operate the thermoacoustic device with saved energy.

According to the above aspect of the disclosure, the rigidity of the diaphragm can be changed without replacing the diaphragm, and the efficiency of work achieved by the thermoacoustic phenomenon can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
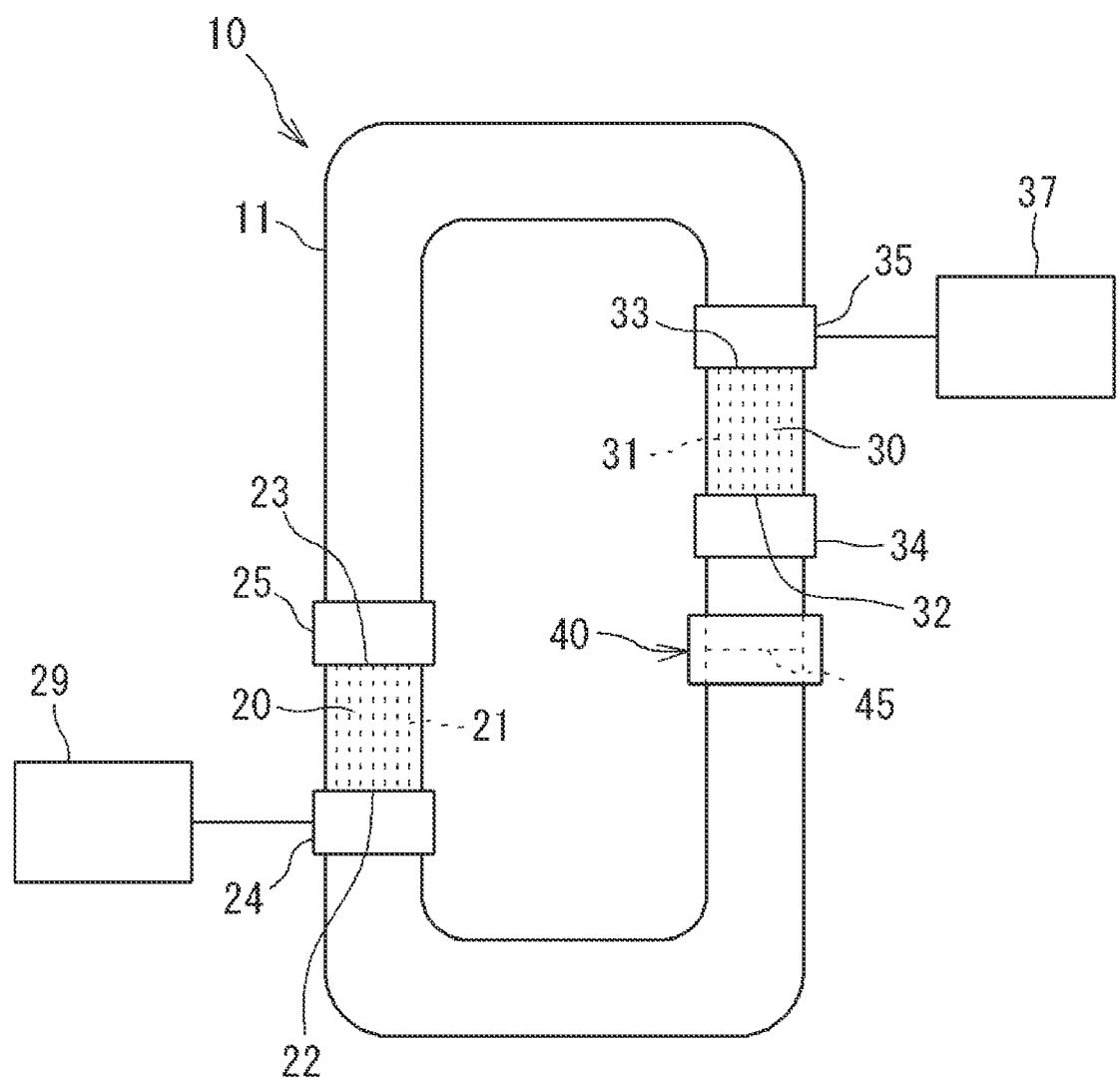
FIG. 1 is a configuration diagram schematically showing an example of a thermoacoustic device.

FIG. 1 is a configuration diagram schematically showing an example of a thermoacoustic device 10. The thermoacoustic device 10 of the disclosure includes a loop tube 11, and a first stack 20 and a second stack 30 each provided in the loop tube 11. A working gas is sealed in the loop tube 11. The working gas is, for example, air, nitrogen, helium, argon, or a mixture of at least two thereof.

The first stack 20 is a columnar member, and has a plurality of micro flow paths 21 extending through the loop tube 11 in the axis direction of the loop tube 11. The second stack 30 is also a columnar member and has a plurality of micro flow paths 31 extending through the loop tube 11 in the axis direction of the loop tube 11. The micro flow paths 21, 31 serve as passages for the working gas.

A temperature gradient occurs between a first end 22 and a second end 23 of the first stack 20 in the axial direction. In the disclosure, the temperature at the first end 22 of the first stack 20 is higher than the temperature at the second end 23 of the first stack 20. When the temperature gradient exceeds a critical point, the working gas in the first stack 20 vibrates. The vibration of the working gas generates sound waves. As a result, sound waves including standing waves are generated in the working gas in the loop tube 11. Due to the sound waves, the working gas in the micro flow paths 31 of the second stack 30 vibrates. Then, a temperature gradient occurs in the second stack 30. In the disclosure, a temperature gradient occurs in which the temperature at a first end 32 of the second stack 30 is higher than the temperature at a second end 33 of the second stack 30. In this way, the first stack 20 converts heat energy into sound energy, and the second stack 30 converts sound energy into heat energy.

The first stack 20 and the second stack 30 have the same configurations in the disclosure, but may have different configurations (for example, the first stack 20 and the second stack 30 may have different lengths in the tube axis direction). The first stack 20 and the second stack 30 are made of, for example, ceramic, and alternatively may be made of metal (for example, stainless steel).

In the first stack 20, a first high-temperature side heat exchanger 24 is provided on the first end 22 in which the temperature becomes high, and a first low-temperature side heat exchanger 25 is provided on the second end 23 in which the temperature becomes low. The heat exchangers 24, 25 perform heat exchange between the outside of the loop tube 11 and the first stack 20. In the second stack 30, a second high-temperature side heat exchanger 34 is provided on the first end 32 in which the temperature becomes high, and a second low-temperature side heat exchanger 35 is provided on the second end 33 in which the temperature becomes low. The heat exchangers 34, 35 perform heat exchange between the outside of the loop tube 11 and the second stack 30.

The first high-temperature side heat exchanger 24 receives heat (thermal energy) from an external heat source 29. This heat is transmitted to the first end 22 of the first stack 20. In this way, the first high-temperature side heat exchanger 24 heats the first end 22 of the first stack 20 from the outside of the loop tube 11, and raises the temperature of the first end 22 to a higher temperature (than the second end 23).

The first low-temperature side heat exchanger 25 adjusts the temperature of the second end 23 by conducting heat between the outside of the loop tube 11 and the second end 23 of the first stack 20. Specifically, the first low-temperature side heat exchanger 25 has a function of adjusting the temperature of the second end 23 of the first stack 20 such that the temperature of the second end 23 does not exceed a predetermined reference temperature (first reference temperature). The first reference temperature is a temperature lower than the temperature of the first end 22 of the first stack 20.

The first high-temperature side heat exchanger 24 and the first low-temperature side heat exchanger 25 control the temperature gradient (temperature difference) between the first end 22 and the second end 23 of the first stack 20. The first low-temperature side heat exchanger 25, the first stack 20, and the first high-temperature side heat exchanger 24 constitute a thermoacoustic prime mover (thermoacoustic engine) that converts heat of the heat source 29 into the vibration of the working gas in the loop tube 11 to generate sound waves.

As described above, sound waves are generated by the temperature gradient generated in the first stack 20, and the temperature gradient is generated in the second stack 30 by the generated sound waves. At this time, the temperature of the first end 32 of the second stack 30 becomes higher than the temperature of the second end 33 of the second stack 30.

The second high-temperature side heat exchanger 34 is provided on the first end 32 in which the temperature becomes high when the temperature gradient occurs in the second stack 30. The second low-temperature side heat exchanger 35 is provided on the second end 33 in which the temperature becomes low when a temperature gradient occurs in the second stack 30.

The second high-temperature side heat exchanger 34 has a function of adjusting the temperature of the first end 32 by conducting heat between the outside of the loop tube 11 and the first end 32 of the second stack 30. For example, the second high-temperature side heat exchanger 34 keeps the temperature of the first end 32 of the second stack 30 constant (for example, at room temperature).

The second low-temperature side heat exchanger 35 is connected to a cooling target 37 provided outside the loop tube 11 such that heat is conducted between the second low-temperature side heat exchanger 35 and the cooling target 37. The second low-temperature side heat exchanger 35 absorbs heat outside the loop tube 11 (heat of the cooling target 37) and transmits the heat to the second end 33 of the second stack 30. Thus, the cooling target 37 can be cooled. In other words, the second low-temperature side heat exchanger 35 takes out the cold heat of the second end 33 of the second stack 30 with low temperature and transmits the cold heat outside the loop tube 11 (cooling target 37) due to the temperature gradient generated in the second stack 30.

The second low-temperature side heat exchanger 35, the second stack 30, and the second high-temperature side heat exchanger 34 constitute a thermoacoustic heat pump that generates a temperature gradient from sound waves (vibration of the working gas).

The thermoacoustic device 10 shown in FIG. 1 further includes a diaphragm structure 40 that includes a diaphragm 39 provided in the loop tube 11. The diaphragm 39 is configured to vibrate so as not to hinder the vibration of the working gas. Thus, the diaphragm 39 is formed of a film-shaped elastic body. The sound waves in the loop tube 11 generated by the temperature gradient of the first stack 20 can be, for example, amplified by the diaphragm 39.

Figure 2:
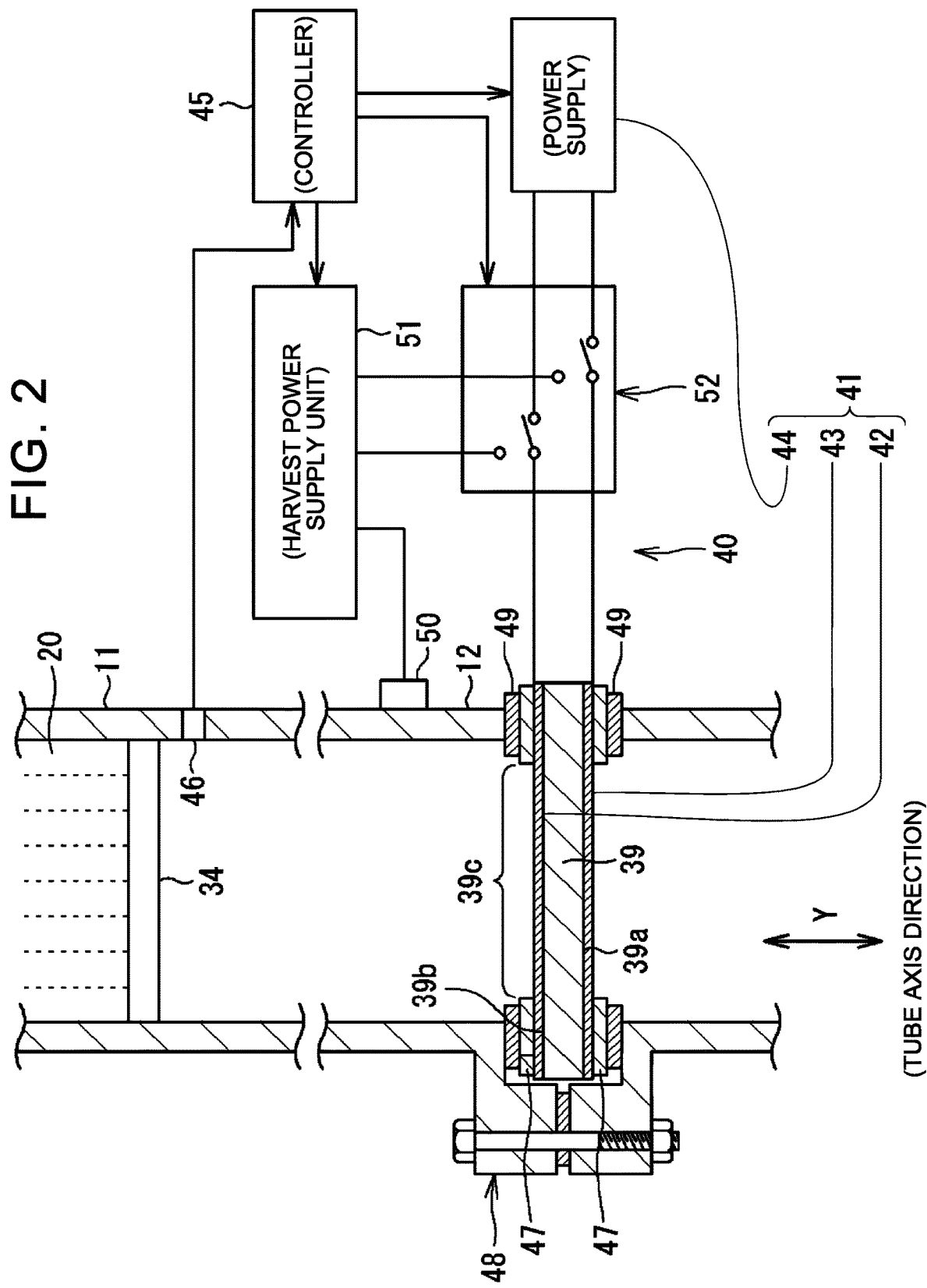
FIG. 2 is an explanatory diagram of a diaphragm structure.

FIG. 2 is an explanatory diagram of the diaphragm structure 40. The diaphragm structure 40 includes the diaphragm 39 provided in a part of the loop tube 11 and an operation unit 41 that changes the rigidity of the diaphragm 39. The diaphragm 39 of the disclosure is a thin film member having an inverse piezoelectric effect. More specifically, the diaphragm 39 is a piezoelectric film (polymer piezoelectric film). When a voltage (electric field) is applied to the diaphragm 39, the diaphragm 39 can expand and contract in a direction along a surface 39a in accordance with the magnitude of the voltage (electric field). The diaphragm 39 expands or contracts by a deformation amount (expansion amount or contraction amount) corresponding to the magnitude of the voltage (electric field).

The operation unit 41 of the disclosure includes electrodes 42, 43 and a power supply 44. To generate a potential difference between a first surface of the diaphragm 39 and a second surface of the diaphragm 39, the first electrode 42 is attached to the first surface of the diaphragm 39, and the second electrode 43 is attached to the second surface of the diaphragm 39. The power supply 44 applies a voltage to the electrodes 42, 43.

The electrodes 42, 43 may be provided on the entire first surface and the entire second surface of the diaphragm 39, and alternatively may be provided partially on a peripheral portion 39b of the diaphragm 39, for example. Note that the range where the electric field is generated and/or the amount of the generated electric field differ depending on the area (range) of the electrodes 42, 43 with respect to the diaphragm 39. In the diaphragm 39, a region affected by the electric field expands and contracts. Therefore, as the area of each of the electrodes 42, 43 increases, the amount of expansion and contraction increases, and the amount of change in rigidity increases. That is, the amount of change in rigidity increases when the electrodes 42, 43 are provided on the entire first surface and the entire second surface of the diaphragm 39.

Figure 3:
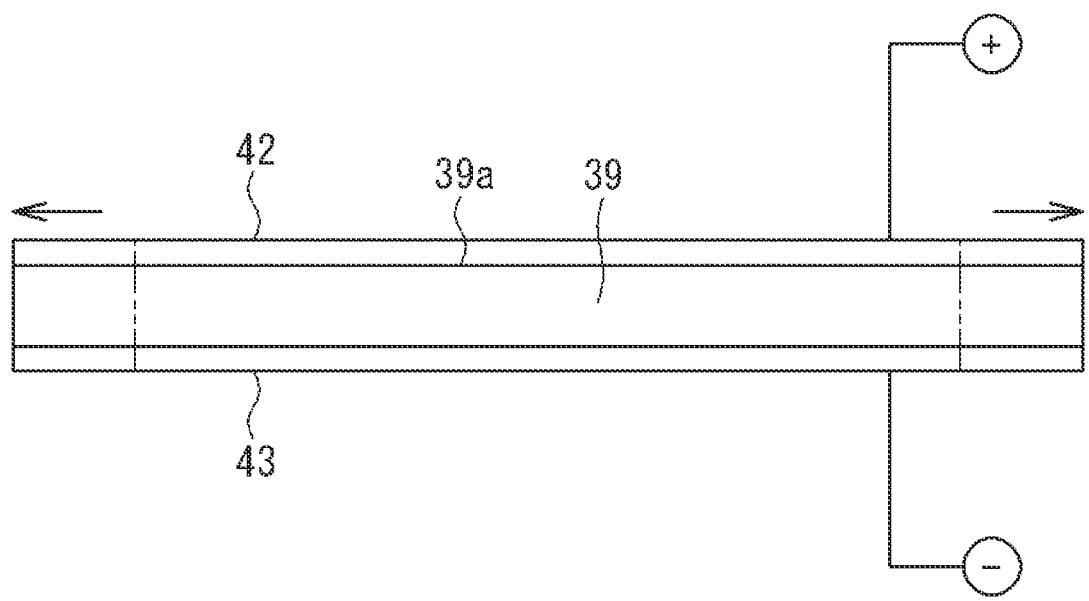
FIG. 3 is an explanatory diagram showing an inverse piezoelectric effect of a diaphragm.

With the above configuration, when the power supply 44 applies a voltage to the diaphragm 39 via the electrodes 42, 43, the diaphragm 39 is deformed by the inverse piezoelectric effect. FIG. 3 is an explanatory diagram showing the inverse piezoelectric effect of the diaphragm 39. As shown in FIG. 3, when a voltage is applied to both surfaces of the diaphragm 39, the diaphragm 39 expands in a direction along the surface 39a.

As shown in FIG. 2, the diaphragm structure 40 includes a pair of annular restraining members 47. Each of the restraining members 47 has an outer peripheral contour shape similar to that of the diaphragm 39. The diaphragm 39 to which the electrodes 42, 43 are attached is sandwiched between the pair of restraining members 47 and attached to a flange portion 48 provided on the loop tube 11. In the disclosure, since the loop tube 11 and the restraining members 47 are made of metal, insulating members 49 are interposed between the flange portion 48 and the restraining members 47. The insulating members 49 electrically insulate the electrodes 42, 43 from the loop tube 11.

The peripheral portion 39b of the diaphragm 39 is restrained (i.e., fixed) to the loop tube 11 by the restraining members 47. A region 39c of the diaphragm 39 can vibrate in the tube axis direction. The region 39c is closer to the center of the diaphragm 39 than the peripheral portion 39b is. In FIG. 2, the tube axis direction is indicated by an arrow Y. The diaphragm 39 may be fixed to the restraining members 47 such that tension is applied to the diaphragm 39 in the direction along the surface 39a when no voltage is applied to the diaphragm 39.

The diaphragm 39 is restrained at its peripheral portion 39b. Thus, when the diaphragm 39 expands (extends) in the direction along the surface 39a due to the inverse piezoelectric effect, the tension of the diaphragm 39 decreases, and the rigidity of the diaphragm 39 in the tube axis direction (Y direction) decreases. Therefore, the diaphragm 39 can vibrate with a large amplitude. In contrast, when the diaphragm 39 contracts (from its expanded state) in the direction along the surface 39a, the tension of the diaphragm 39 increases, and the rigidity of the diaphragm 39 in the tube axis direction (Y direction) increases. Therefore, the diaphragm 39 can vibrate with a small amplitude. In this way, an apparent rigidity of the diaphragm 39 in the tube axis direction changes.

In the disclosure, a voltage is applied to the diaphragm 39 to change the rigidity of the diaphragm 39. That is, the physical quantity applied to the diaphragm 39 to change the rigidity is a voltage. Each of the diaphragm 39 and the operation unit 41 may have other configurations. For example, although not shown, the operation unit 41 may have a configuration including a heater configured to heat the diaphragm 39 and a power supply configured to supply electric power to the heater. In this case, the physical quantity applied to the diaphragm 39 is temperature. The temperature of the diaphragm 39 changes due to the heat of the heater, and the rigidity of the diaphragm 39 changes due to thermal expansion. In this way, the operation unit 41 may have any configuration as long as the operation unit 41 applies a required physical quantity to the diaphragm 39 to change the rigidity of the diaphragm 39 in the tube axis direction.

The diaphragm structure 40 further includes a controller 45. The controller 45 performs control to change the voltage (physical quantity) applied to the diaphragm 39. The controller 45 is a computer. In other words, the controller 45 is an electronic control unit including a processor and so on. The controller 45 outputs a control signal to the power supply 44. The control signal includes information on the magnitude of the voltage to be applied from the power supply 44 to the diaphragm 39. That is, the controller 45 performs control to change the magnitude of the voltage applied from the power supply 44 to the diaphragm 39.

The thermoacoustic device 10 further includes a sensor 46 provided on the loop tube 11. The sensor 46 is configured to detect a parameter correlated with a work flow of the working gas in the loop tube 11. In the disclosure, the parameter represents a pressure amplitude of the working gas in the loop tube 11. The sensor 46 is a pressure sensor that detects the pressure of the working gas in the loop tube 11 to detect the pressure amplitude. The sensor 46 detects the pressure of the working gas and outputs a detection signal to the controller 45. The controller 45 detects the value (magnitude) of the pressure amplitude of the working fluid (i.e., working gas) based on the detection signal. The controller 45 constantly detects the value of the pressure amplitude. Based on the detection result, the controller 45 performs control to change the rigidity of the diaphragm 39.

The parameter may be, for example, the temperature of the stack 30 or the ambient temperature around the stack 30. In this case, the sensor 46 is a temperature sensor, and preferably detects the temperature of a part of the stack 30 on the high temperature side or the temperature around a part of the stack 30 on the high temperature side.

The relationship between the work flow of the working gas in the loop tube 11 and the pressure amplitude (pressure amplitude amount) of the working gas will be described. There is a correlation between the work flow and the pressure amplitude. When the pressure amplitude is large, the work flow is large, and when the pressure amplitude is small, the work flow is small. That is, when the work flow of the working gas in the loop tube 11 is reduced, the pressure amplitude of the working gas is reduced. It can be considered that the pressure amplitude is the magnitude of the sound intensity in the loop tube 11.

A specific example of the control performed by the controller 45 will be described. When the work flow of the working gas in the loop tube 11 is reduced, the pressure amplitude of the working gas is reduced. Then, the controller 45 reduces the rigidity of the diaphragm 39 in the tube axis direction. To do so, the controller 45 performs control to reduce the voltage (physical quantity) applied to the diaphragm 39 as compared with the voltage applied until then. In contrast, when the work flow of the working gas in the loop tube 11 is increased, the pressure amplitude of the working gas is increased. Then, the controller 45 increases the rigidity of the diaphragm 39 in the tube axis direction. To do so, the controller 45 performs control to increase the voltage (physical quantity) applied to the diaphragm 39 as compared with the voltage applied until then. The above control is referred to as "normal operation control".

In addition to the normal operation control, the control performed by the controller 45 includes a fail-safe control described below. Upon acquiring the parameter (in the disclosure, the pressure amplitude of the working gas), the controller 45 compares the value of the parameter and a preset threshold. This comparison process may be performed each time a parameter is acquired. When the parameter exceeds the threshold, the controller 45 increases the rigidity of the diaphragm 39 to a required rigidity. The required rigidity is a rigidity that allows the vibration of the working gas in the loop tube 11 to be restrained (i.e., a rigidity that can restrain the vibration of the working gas in the loop tube 11). For example, the required rigidity of the diaphragm 39 may be the highest rigidity in a changeable range. When the rigidity of the diaphragm 39 becomes the required rigidity, the vibration of the working gas in the loop tube 11 is blocked by the diaphragm 39.

According to the fail-safe control, for example, the thermoacoustic phenomenon in the thermoacoustic device 10 can be stopped without stopping the operation of the heat source 29, which is equipment configured to apply heat to the stack 20 (see FIG. 1). The heat source 29 is, for example, a heat treatment furnace that outputs a high-temperature fluid as exhaust heat. The temperature of the stack 20 becomes high due to the exhaust heat of the heat treatment furnace. In this case, the operation of the thermoacoustic device 10 can be stopped without stopping the operation of the heat treatment furnace.

When the circulation of the work flow of the working gas is not established in the loop tube 11 (i.e., when the circulation of the work flow of the working gas is disturbed in the loop tube 11), that is, when the balance between the increase in the work flow due to the heat source 29 and the consumption of the work flow due to the cooling target 37 is likely to be lost, the controller 45 first performs the normal operation control described above. That is, if the balance is to be lost, the controller 45 increases the rigidity of the diaphragm 39 to reduce the amplitude amount of the working gas, or reduces the rigidity of the diaphragm 39 to increase the amplitude amount of the working gas. Thus, the balance is adjusted. In the case where the imbalance described above cannot be resolved by performing the normal operation control, the controller 45 may perform the fail-safe control. Thus, the work flow is stopped by the diaphragm 39.

In the above description, the parameter correlated with the work flow of the working gas is the pressure amplitude of the working gas. However, when the parameter correlated with the work flow of the working gas is the temperature of a part of the stack 30 on the high temperature side or the temperature around a part of the stack 30 on the high temperature side, the sensor 46 serves as a temperature sensor. In this case, if the detection result of the sensor 46 indicates a temperature higher than that until then (i.e., if the detection result of the sensor 46 indicates an increase in the temperature), the controller 45 performs control to increase the rigidity of the diaphragm 39. In contrast, if the detection result of the sensor 46 indicates a temperature lower than that until then (i.e., if the detection result of the sensor 46 indicates a decrease in the temperature), the controller 45 performs control to reduce the rigidity of the diaphragm 39.

The thermoacoustic device 10 shown in FIG. 2 further includes a vibration power generation unit 50 provided on a tube wall 12 of the loop tube 11 and a harvest power supply unit 51. When the thermoacoustic phenomenon occurs in the loop tube 11, the working gas vibrates and generates sound waves as described above. Thus, the tube wall 12 vibrates. The vibration power generation unit 50 including a piezoelectric element is attached to the tube wall 12, and the piezoelectric element is deformed due to the vibration of the tube wall 12. Electric energy is output from the vibration power generation unit 50 by the piezoelectric effect of the piezoelectric element. As described above, the vibration power generation unit 50 includes the piezoelectric element, and the vibration power generation unit 50 converts the vibration of the tube wall 12 into electric energy. The harvest power supply unit 51 outputs energy for applying a required physical quantity (voltage) to the diaphragm 39 based on the electric energy obtained by the vibration power generation unit 50. In the disclosure, the harvest power supply unit 51 outputs electric energy as a voltage and applies the voltage to the diaphragm 39.

The diaphragm structure 40 shown in FIG. 2 includes switches 52. The switches 52 perform an operation of switching an energizing path so that a power supply for applying a voltage to the diaphragm 39 is selected from the regular power supply 44 and the harvest power supply unit 51. This switching operation is performed based on the control signal of the controller 45. For example, the regular power supply 44 is used to change the rigidity of the diaphragm 39 during the period from the start of operation of the thermoacoustic device 10 to the generation of vibration of the working gas, and once the vibration occurs in the working gas, the harvest power supply unit 51 is used. By providing the harvest power supply unit 51, it is possible to operate the thermoacoustic device 10 with saved energy.

Although not shown, one of the regular power supply 44 and the harvest power supply unit 51 may be omitted. In a state where the diaphragm 39 is attached to the loop tube 11 by the restraining members 47, the rigidity of the diaphragm 39 is set to a predetermined initial rigidity. The initial rigidity is a rigidity that allows the working gas in the loop tube 11 to vibrate when a predetermined temperature difference is generated in the stack 20 to start the thermoacoustic device 10, instead of a rigidity that restrains vibration in, for example, the fail-safe control described above. When the vibration of the working fluid (i.e., the working gas) is started, the vibration power generation unit 50 converts the vibration of the tube wall 12 into electric energy and outputs the electric energy. Then, based on the electric energy, the harvest power supply unit 51 supplies electric power to the diaphragm 39, and thus the rigidity of the diaphragm 39 is changed. In this case, the regular power supply 44 is not necessary. That is, the power supply of the operation unit 41 may be the harvest power supply unit 51.

As described above, the thermoacoustic device 10 of the disclosure includes the loop tube 11 in which the working gas is sealed, the stacks 20, 30 provided in the loop tube 11, and the diaphragm structure 40. A temperature gradient in the tube axis direction of the loop tube 11 occurs in the stacks 20, 30. The diaphragm structure 40 includes the diaphragm 39 provided in the loop tube 11 and the operation unit 41. The diaphragm 39 has the surface 39a extending in a direction intersecting (perpendicular to) the tube axis direction, and the diaphragm 39 can vibrate with a component (i.e., a component of vibration) in the tube axis direction. The operation unit 41 applies a required physical quantity to the diaphragm 39 to change the rigidity of the diaphragm 39 in the tube axis direction. The physical quantity of the disclosure is a voltage.

The characteristics (rigidity) of the diaphragm 39 affect the movement of the working gas in the loop tube 11. In the thermoacoustic device 10 having the above-described configuration, the rigidity (apparent rigidity) of the diaphragm 39 is changed by applying a voltage to the diaphragm 39 with the use of the operation unit 41, without replacing the diaphragm 39. When the rigidity of the diaphragm 39 is set to a rigidity matching the movement of the working gas, it is possible to further improve the efficiency of work achieved by the thermoacoustic phenomenon.

The diaphragm structure 40 includes the controller 45, and the controller 45 performs control to change a physical quantity (voltage) applied to the diaphragm 39. With the controller 45, the rigidity of the diaphragm 39 can be variously changed in accordance with the state of the thermoacoustic device 10, that is, in accordance with the movement of the working gas.

The thermoacoustic device 10 includes the sensor 46 configured to detect the parameter correlated with the work flow of the working gas. In the disclosure, the parameter is the pressure amplitude of the working gas in the loop tube 11. Alternatively, the parameter may be a temperature of the stack 30 or the ambient temperature around the stack 30. The temperature of the stack 30 (or the ambient temperature around the stack 30) and the pressure amplitude of the working gas are parameters that affect the magnitude of the work flow of the working gas. In view of this, detecting the parameter using the sensor 46 makes it possible to adjust the rigidity of the diaphragm 39 in accordance with the work flow. Therefore, it is possible to further improve the efficiency of work achieved by the thermoacoustic phenomenon.

The diaphragm 39 can have the rigidity corresponding to the state of the working gas. For example, the rigidity of the diaphragm 39 with the pressure amplitude at the start of operation may differ from the rigidity of the diaphragm 39 with the pressure amplitude during stable vibration. When the filling pressure (i.e., charging pressure) of the working gas is increased to increase the output of the thermoacoustic device 10, the rigidity of the diaphragm 39 may be changed in accordance with the filling pressure. This is made possible with the thermoacoustic device 10 of the disclosure. The rigidity of the diaphragm 39 can be changed during the vibration of the working gas. In the related art, to change the rigidity of the diaphragm, it has been necessary to disassemble the device, replace the diaphragm, and reassemble the device. Reassembly requires fine adjustment of the position of, for example, the diaphragm. However, the thermoacoustic device 10 of the disclosure need not be reassembled when the rigidity of the diaphragm 39 is changed. Therefore, the fine adjustment as in the related art is omitted.

When the parameter is changed due to a decrease in the work flow of the working gas in the loop tube 11, the controller 45 reduces the rigidity of the diaphragm 39. In contrast, when the parameter is changed due to an increase in the work flow, the controller 45 increases the rigidity of the diaphragm 39 (normal operation control). In the normal operation control, when the work flow of the working gas is small, the thermoacoustic device 10 is adjusted such that the rigidity of the diaphragm 39 is reduced and the vibration of the working gas is less likely to be inhibited by the diaphragm 39 to increase the work flow. In contrast, when the work flow of the working gas is large, the thermoacoustic device 10 is adjusted such that the rigidity of the diaphragm 39 is increased and the vibration of the working gas is reduced by the diaphragm 39 to reduce the work flow.

Further, as described above, the controller 45 can perform the fail-safe control. That is, when the parameter exceeds the threshold, the controller 45 increases the rigidity of the diaphragm 39 to a rigidity that allows the vibration of the working gas to be restrained (i.e., a rigidity that can restrain the vibration of the working gas). With this control, for example, the thermoacoustic phenomenon in the thermoacoustic device 10 can be stopped without stopping the operation of the heat source 29, which applies heat to the stack 20.

As described above, in the thermoacoustic device 10 of the disclosure, the rigidity of the diaphragm 39 can be changed without replacing the diaphragm 39. This makes it possible to further improve the efficiency of work achieved by the thermoacoustic phenomenon.

The embodiments disclosed in the disclosure are illustrative but not restrictive in all respects. The scope of the disclosure is not limited to the embodiments described above, and includes any and all modifications within the scope equivalent to the configuration described in the claims. For example, the shape of the loop tube 11 and the arrangement of the stacks 20, 30, etc. may be other than those illustrated in the drawings.

What is claimed is:

1. A thermoacoustic device comprising:
   a loop tube in which a working gas is sealed;
   a stack in which a temperature gradient is generated in a tube axis direction of the loop tube, the stack being provided in the loop tube;
   a diaphragm structure including a diaphragm provided in the loop tube, an operation unit, and a controller operating as an electronic control unit, the diaphragm having a surface extending in a direction intersecting the tube axis direction and being configured to vibrate with a component of vibration in the tube axis direction, the operation unit being configured to apply a physical quantity that is required, to the diaphragm to change a rigidity of the diaphragm in the tube axis direction, and the electronic control unit being configured to perform control to change the physical quantity applied to the diaphragm; and
   a sensor configured to detect a parameter correlated with a work flow of the working gas, wherein the electronic control unit is configured to perform control to reduce the rigidity of the diaphragm when the parameter changes due to a decrease in the work flow, and to increase the rigidity of the diaphragm when the parameter changes due to an increase in the work flow.

2. The thermoacoustic device according to claim 1, wherein:
   the diaphragm is a thin film member having an inverse piezoelectric effect; and
   the operation unit includes electrodes configured to generate a potential difference in the diaphragm, and a power supply configured to apply a voltage to the electrodes.

3. The thermoacoustic device according to claim 1, wherein:
   the diaphragm is configured to expand and contract in a direction along the surface based on the physical quantity;
   the diaphragm structure further includes a restraining member that restrains a peripheral portion of the diaphragm; and
   a region of the diaphragm is configured to vibrate in the tube axis direction, the region of the diaphragm being closer to a center of the diaphragm than the peripheral portion is.

4. The thermoacoustic device according to claim 1, wherein the parameter is one of i) a temperature of the stack, ii) an ambient temperature around the stack, and iii) a pressure amplitude of the working gas.

5. The thermoacoustic device according to claim 1, wherein the electronic control unit is configured to increase the rigidity of the diaphragm to a rigidity that allows vibration of the working gas to be restrained, when the parameter exceeds a threshold.

6. The thermoacoustic device according to claim 1, further comprising:
   a piezoelectric element provided on a tube wall of the loop tube and configured to convert vibration of the tube wall to electric energy.

7. The thermoacoustic device according to claim 1, wherein the physical quantity is temperature or voltage.

* * * * *